Figure 1:
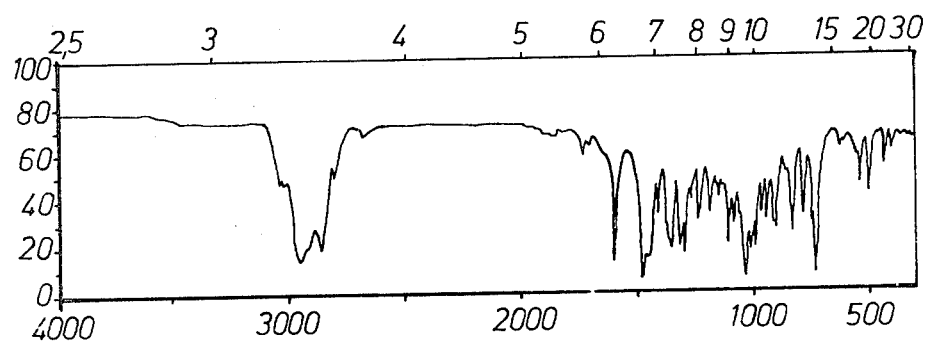

United States Patent

Psaar

[11] 4,201,707
[45] May 6, 1980

[54] METHINE DYESTUFFS CONTAINING A PHENYL AZO GROUP

[75] Inventor: Hubertus Psaar, Leverkusen, Fed. Rep. of Germany

[73] Assignee: Bayer Aktiengesellschaft, Leverkusen, Fed. Rep. of Germany

[21] Appl. No.: 919,311

[22] Filed: Jun. 26, 1978

Related U.S. Application Data

[62] Division of Ser. No. 683,622, May 5, 1976, Pat. No. 4,138,570.

[30] Foreign Application Priority Data

May 9, 1975 [DE] Fed. Rep. of Germany ....... 2520816

[51] Int. Cl.² .................. C09B 29/34; C09B 29/36; C09B 29/38; D06P 3/24
[52] U.S. Cl. .................. 260/162; 106/14.5; 106/22; 260/163; 260/165; 542/413; 542/426; 542/468; 546/82; 548/374
[58] Field of Search .................. 260/160, 162, 163

[56] References Cited

U.S. PATENT DOCUMENTS

| 3,073,820 | 1/1963 | Plue | 548/379 X |
| 3,206,453 | 9/1965 | Merian et al. | 260/162 X |
| 3,957,815 | 5/1976 | Mengler | 548/379 |

FOREIGN PATENT DOCUMENTS 712764 7/1954 United Kingdom ............ 548/379

*Primary Examiner*—Floyd D. Higel
*Attorney, Agent, or Firm*—Sprung, Felfe, Horn, Lynch & Kramer

[57] ABSTRACT

Dyestuffs of the formula

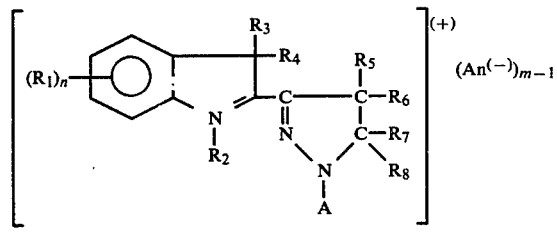

wherein
  $R_1$ denotes halogen, alkyl, cycloalkyl, aralkyl, nitro, cyano, acyl, acylamino, amino, aminocarbonyl, aminosulphonyl, alkylsulphonyl, arylsulphonyl, alkoxy, aryloxy, aralkoxy, carboxyl, alkoxycarbonyl, aryloxycarbonyl or aralkoxycarbonyl or arylazo,
  $R_2$ denotes alkyl, alkenyl, cycloalkyl, aryl or aralkyl,
  $R_3$ and $R_4$ denote alkyl, cycloalkyl or aralkyl,
  $R_5$, $R_6$, $R_7$ and $R_8$ denote hydrogen, alkyl, cycloalkyl, aralkyl or aryl, and
wherein
  $R_6$ and $R_7$ can together form a fused cycloaliphatic ring,
  A denotes aryl or heteryl,
  n denotes 0, 1 or 2 and
  $An^{(-)}$ denotes an anion, process for their preparation and their use for dyeing and printing especially polyacrylonitrile and acid modified polyamides and polyesters.

5 Claims, 4 Drawing Figures

METHINE DYESTUFFS CONTAINING A PHENYL AZO GROUP

This is a division of application Ser. No. 683,622, filed May 5, 1976, now U.S. Pat. No. 4,138,570.

The invention relates to dyestuffs of the general formula

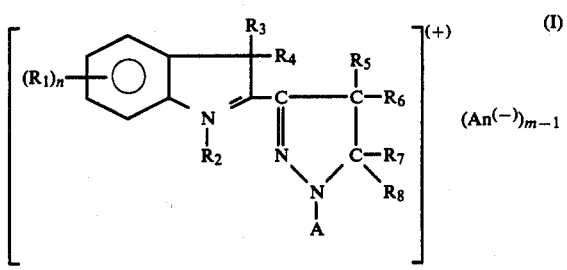

wherein
$R_1$ denotes halogen, alkyl, cycloalkyl, aralkyl, nitro, cyano, acyl, acylamino, amino, aminocarbonyl, aminosulphonyl, alkylsulphonyl, arylsulphonyl, alkoxy, aryloxy, aralkoxy, carboxyl, alkoxycarbonyl, aryloxycarbonyl or aralkoxycarbonyl or arylazo,
$R_2$ denotes alkyl, alkenyl, cycloalkyl, aryl or aralkyl,
$R_3$ denotes alkyl, cycloalkyl or aralkyl,
$R_4$ denotes alkyl, cycloalkyl or aralkyl,
$R_5$, $R_6$, $R_7$ and $R_8$ denote hydrogen, alkyl, cycloalkyl, aralkyl or aryl, and wherein
$R_6$ and $R_7$ can together form a fused cycloaliphatic ring,
A denotes aryl or heteryl,
n denotes 0, 1 or 2 and
$An^{(-)}$ denotes an anion and wherein
the substituents $R_1$–$R_8$ and A can be substituted by non-ionic substituents and/or a carboxyl group and
A can furthermore be substituted by one or more sulpho groups, and wherein
m denotes 1 or 2, but can represent 1 only if A is substituted by one or more sulpho groups.

The ring A can preferably be substituted by 1–3 sulpho groups.

The invention further relates to processes for the preparation of these dyestuffs and to their use for dyeing and printing natural and synthetic materials.

The following may be mentioned as examples of $R_1$ to $R_8$: as alkyl radicals, above all $C_1$–$C_6$-alkyl radicals, such as the methyl, ethyl, n- and i-propyl and n-, sec.- and t-butyl radical and the n- and i-amyl and n-hexyl radical, and also $C_1$–$C_6$-alkyl radicals substituted by a carboxyl group or by non-ionic substituents, such as halogen atoms or hydroxyl, $C_1$–$C_4$-alkoxy, cyano, $C_1$–$C_4$-alkoxycarbonyl or carboxylic acid amide groups, such as the 2-chloroethyl, 2-bromoethyl, 2-hydroxyethyl, 2-methoxyethyl, 2-cyanoethyl, 2-acetoxyethyl, 2-carbonamido-ethyl, 2-carboxyethyl, 2-methoxycarbonylethyl, 2-ethoxycarbonylethyl, 2-hydroxypropyl-(1), 3-cyanopropyl, 2-hydroxy-n-propyl, 2-hydroxy-n-butyl, 2-hydroxy-i-butyl, 2-hydroxy-3-allyloxy-n-propyl and 3-methoxycarbonyl-n-butyl radical; as alkenyl radicals, above all $C_2$–$C_6$-alkenyl radicals, such as the vinyl, allyl or methallyl radical, and their derivatives substituted by non-ionic radicals, such as halogen, such as the 2-chloroallyl radical; as cycloalkyl radicals, above all the cyclopentyl and cyclohexyl radical and their derivatives substituted by non-ionic substituents, such as halogen or $C_1$–$C_6$-alkyl groups, such as the 4-chlorocyclohexyl and dimethylcyclohexyl radical; as aralkyl radicals, above all the benzyl, 2-phenylethyl or 2-phenylpropyl-(2) radical and their derivatives substituted in the phenyl nucleus by non-ionic radicals such as halogen, cyano, nitro, $C_1$–$C_4$-alkoxy or $C_1$–$C_6$-alkyl, such as the 4-chlorobenzyl and 3-methylbenzyl radical; as aryl radicals, above all the phenyl and naphthyl radical and their derivatives substituted by a carboxyl group and/or non-ionic radicals such as halogen, cyano, nitro, $C_1$–$C_6$-alkyl or $C_1$–$C_4$-alkoxy, such as the 4-chlorophenyl, 4-methylphenyl, 4-methoxyphenyl or 4-nitrophenyl radical.

Preferentially, 1–3 non-ionic radicals can be present.

Halogen is preferably to be understood as fluorine, chlorine or bromine. Examples of suitable acyl groups are $C_1$–$C_3$-alkyl-carbonyl and -sulphonyl, benzoyl and phenylsulphonyl radicals.

$R_6$ and $R_7$, together with the two carbon atoms to which they are bonded, preferably form a cyclohexane ring.

A preferably represents a radical of the benzene, naphthalene, thiazole, benzothiazole, 1,3,4-thiadiazole, 1,2,4-thiadiazole, 1,2,4-triazole, benzotriazole or benzisothiazole series.

The isolated or fused benzene rings can carry 1–4 substituents, such as halogen, cyano, nitro, $C_1$–$C_6$-alkyl, trifluoromethyl, phenyl, benzyl, $C_1$–$C_4$-alkoxy, phenoxy, benzyloxy, $C_1$–$C_4$-alkoxy-$C_1$–$C_4$-alkoxy, mono- and di-$C_1$–$C_4$-alkylamino, phenylamino, benzylamino, $C_1$–$C_3$-alkylcarbonylamino, formyl, $C_1$–$C_3$-alkylcarbonyl, benzoyl, carboxyl, $C_1$–$C_4$-alkoxycarbonyl, phenyloxycarbonyl, $C_1$–$C_4$-alkoxycarbonyl-methyl or -ethyl, aminocarbonyl, mono- and di-$C_1$–$C_4$-alkylaminocarbonyl, $C_1$–$C_4$-alkylsulphonyl, phenylsulphonyl, $C_1$–$C_4$-alkyl- or phenyl-oxysulphonyl, aminosulphonyl, mono- and di-$C_1$–$C_4$-alkylaminosulphonyl, $C_1$–$C_4$-alkoxycarbonylamino, $C_1$–$C_4$-alkylaminocarbonylamino or phenylazo.

The heterocyclic rings A are in particular substituted by nitro, $C_1$–$C_4$-alkyl or phenyl.

Possible anionic radicals $An^-$ are the organic and inorganic anions which are customary for cationic dyestuffs. Colourless anions are preferred.

Examples of inorganic anions are fluoride, chloride, bromide, and iodide, perchlorate, hydroxyl, bisulphate, sulphate, disulphate, nitrate, dihydrogen phosphate, hydrogen phosphate, phosphate, metaphosphate, bicarbonate, carbonate, methosulphate, ethosulphate, cyanate, thiocyanate, trichlorozincate and tetrachlorozincate, stannate, borate, divanadate, molybdate, tungstate, chromate, tetrafluoborate, as well as anions of esters of boric acid, such as of the glycerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, propionic acid, butyric acid, dichloroacetic acid, trichloroacetic acid, trifluoroacetic acid, 2- and 3-chloropropionic acid, 3-hydroxypropionic acid, O-ethylglycollic acid, thioglycollic acid, glyceric acid, dodecyl-tetraethylene glycol-ether-propionic acid, 3-(nonyloxy)-propionic acid, 3-(isotridecyloxy)-propionic acid 3-(isotridecyloxy)-diethylene glycol-ether-propionic acid, the etherpropionic acid of the alcohol mixture with 6 to 10 carbon atoms, thioacetic acid, nonylphenol-tetraethylene glycol-etherpropionic acid, phenoxyacetic acid, nonylphenoxyacetic acid, n-valeric acid, stearic acid, oleic acid, ricinoleic acid, palmitic acid, n-pelargonic acid, lauric acid, a mixture of aliphatic carboxylic acids with 9 to 11 carbon atoms, a mixture of aliphatic carboxylic acids with 15–19 carbon atoms, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosehacic acid (isomer mixture), tartaric acid, citric acid, glyoxylic acid, fumaric acid, maleic acid, itaconic acid, methanesulphonic acid, ethanesulphonic acid, chloromethanesulphonic acid, 2-chloroethanesulphonic acid and 2-hydroxyethanesulphonic acid and Mersolat, that is to say $C_8$–$C_{15}$ paraffinsulphonic acid, obtained by chlorosulphonation of paraffin oil.

Examples of suitable anions of cycloaliphatic carboxylic acids are the anions of cyclohexanecarboxylic acid and cyclohexane-3-carboxylic acid, and examples of anions of araliphatic monocarboxylic acids are anions of phenylacetic acid and mandelic acid.

Suitable anions of aromatic carboxylic acids are, for example, the anions of benzoic acid, the various isomeric mono- and di-methylbenzoic acids, chlrobenzoic acids, hydroxybenzoic acids, aminobenzoic acids and methoxybenzoic acids, phthalic acid, 4-hydroxyphthalic acid, 4-methoxyphthalic acid, isophthalic acid, terephthalic acid and diphenyl-3,4-carboxylic acid, 3-sulphobenzoic acid, benzene-1,2,4,5-tetracarboxylic acid, naphthalene-1,4,5,8-tetracarboxylic acid, biphenyl-4-carboxylic acid, abietic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid 3-nitrobenzenesulphonic acid, toluene-4-sulphonic acid, toluene-2-sulphonic acid, toluene-$\omega$-sulphonic acid, n-dodecylbenzenesulphonic acid, napthalene-1-sulphonic acid, napthalene-1,4- or -1,5-disulphonic acid, napthalene-1,3,5-trisulphonic acid, 1-naphthol-2-sulphonic acid, 5-nitronaphthalene-2-sulphonic acid, 8-amononaphthalene-1-sulphonic acid, stilbene-2,2'-disulphonic acid and biphenyl-2-sulphonic acid.

An example of a suitable anion of heterocyclic sulphonic acids is the anion of quinoline-5-sulphonic acid.

Further anions which can be used are those of alkyl- and aryl-sulphinic, alkyl- and aryl-phosphonic and alkyl- and aryl-phosphonous acids, such as benzenesulphinic and methyl- and benzene-phosphonic acid.

The anion is in general decided by the preparation process and by the purification of the crude dyestuff which may be carried out. In general the dyestuffs are in the form of halides, especially chlorides or bromides, sulphates, benzenesulphonates or toluenesulphonates, or acetates. The anions can be replaced by other anions in a known manner.

Preferred dyestuffs are those of the general formula

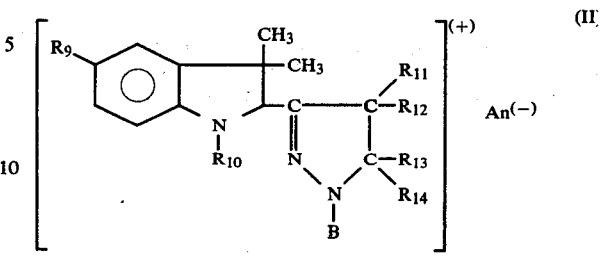

(II)

wherein $R_9$ denotes hydrogen, $C_1$–$C_4$-alkyl, trifluoromethyl, chlorine, bromine, nitro, cyano, $C_1$–$C_4$-alkoxy, $C_1$–$C_4$-alkoxycarbonyl, methyl-, ethyl- or phenylcarbonylamino, amino-carbonyl or -sulphonyl, $C_1$–$C_4$-alkylsulphonyl or phenylsulphonyl or phenylazo, $R_{10}$ denotes $C_1$–$C_4$-alkyl which can be substituted by hydroxyl, chlorine, cyano or aminocarbonyl, or denotes phenyl or benzyl, $R_{11}$ and $R_{12}$ denote hydrogen or $C_1$–$C_4$-alkyl, $R_{13}$ and $R_{14}$ denote hydrogen, $C_1$–$C_4$-alkyl or phenyl, B denotes phenyl which may be monosubstituted, disubstituted or trisubstituted by chlorine, bromine, nitro, cyano, $C_1$–$C_4$-alkyl, phenyl, benzyl, $C_1$–$C_4$-alkoxy, phenoxy, benzyloxy, $C_1$–$C_4$-alkoxycarbonyl, phenyloxycarbonyl, benzyloxycarbonyl, carboxyl, $C_1$–$C_4$-alkylsulphonyl, phenylsulphonyl, benzylsulphonyl, $C_1$–$C_4$-alkoxysulphonyl, phenyloxysulphonyl, benzyloxysulphonyl, aminocarbonyl, mono- or di-$C_1$–$C_4$-alkylaminocarbonyl, aminosulphenyl, mono- or di-$C_1$–$C_4$-alkylamino-sulphonyl, $C_1$–$C_3$-alkylcarbonyl, $C_1$–$C_3$-alkylcarbonylamino, benzoylamino, phenylamino, mono- or di-$C_1$–$C_4$-alkylamine, benzylamino or phenylazo, or B represents 1- or 2-naphthyl or 2-benzthiazolyl and $An^{(-)}$ denotes an anion.

Particularly preferred dyestuffs are those of the general formula

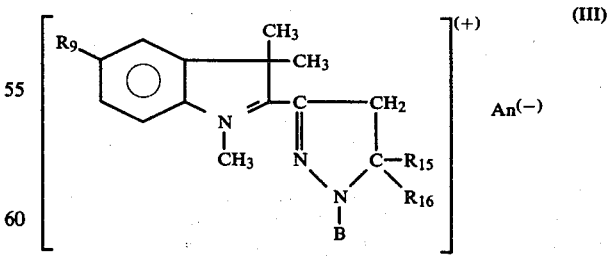

(III)

wherein $R_{15}$ and $R_{16}$ denote hydrogen or $C_1$–$C_4$-alkyl and

B, $R_9$ and $An^{(-)}$ have the abovementioned meanings.

The dyestuffs (I) can be prepared by coupling compounds of the formula

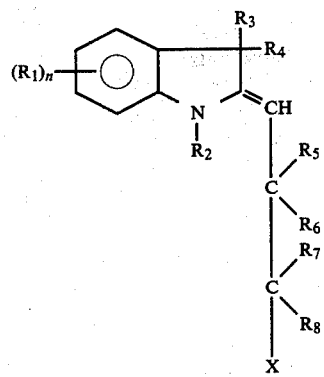

(IV)

wherein
n and $R_1$ to $R_8$ have the abovementioned meaning and X denotes hydroxyl or a group which can be split off as an anion $An^{(-)}$ under the coupling conditions, with a diazonium compound of an amine of the formula $$A-NH_2 \qquad (V)$$

wherein
A has the abovementioned meaning and if appropriate—where starting from the compound with X=OH—subsequently cyclising the product in the presence of a condensation agent.

X preferably represents a hydroxyl, mercapto, halogen, $C_1$-$C_4$-alkoxy, $C_1$-$C_4$-alkylmercapto, formyloxy or acetoxy group, a carbonic acid group esterified by methanol or ethanol, a sulphuric acid or phosphoric acid group optionally esterified by methanol or ethanol, a $C_1$-$C_4$-alkylsulphonic acid group or a benzenesulphonic acid group which is optionally substituted by $C_1$-$C_4$-alkyl.

The coupling can be carried out in aqueous solution with or without addition of organic water-miscible solvents, in a neutral medium or in the presence of alkalis such as sodium acetate, preferably at 0°-50° C.

Examples of suitable organic solvents are methanol, ethanol, propanol, isopropanol, acetone, acetonitrile, dimethylformamide, pyridine, picoline, quinoline or quinaldine.

Suitable condensation agents are acids, acid halides, acid anhyrides or esters of acids, such as sulphuric acid, phosphoric acid, hydrochloric acid, chlorosulphonic acid, phosphorus oxychloride, phosphorus oxybromide, thionyl chloride, dimethyl sulphate, acetyl chloride or acetic anhydride.

The cyclisation can be carried out, for example, at 20°-100° C.; in this reaction, the condensation agent can at the same time serve as the solvent, or a further solvent such as benzene, toluene, xylene, chlorobenzene, dichlorobenzene, ethylene chloride or chloroform can be added.

A further method of preparation of the pyrazoline dyestuffs (I) is the reaction of the compounds of the formula

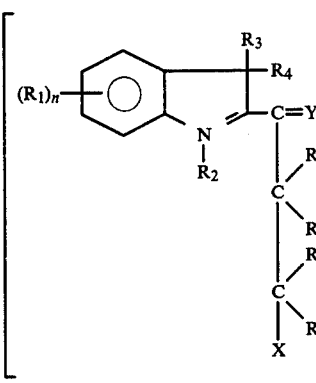

(VI)

wherein
$R_1$ to $R_3$, n and X have the abovementioned meaning and
Y=O or denotes a customary derivative of a ketone such as, for example, N—OH or N—NH$_2$, with hydrazines of the formula $$A-NH-NH_2 \qquad (VII)$$

wherein
A has the abovementioned meaning.

The invention further relates to compounds of the formula (IV), their preparation and their use for the preparation of the dyestuffs (I).

Preferred substituents of the formula (IV) are indicated in formulae (II) and (III).

Compounds of the formula (IV) wherein X represents a hydroxyl group can exist, depending on the substituents, in the tautomeric formulae

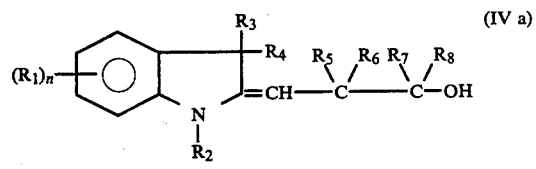

(IV a)

and

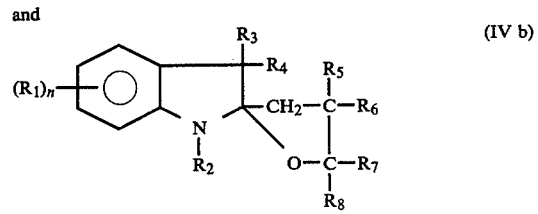

(IV b)

Compounds of the formulae (IV a) and (IV b) are prepared by reacting 2-methylene-indolines of the formula

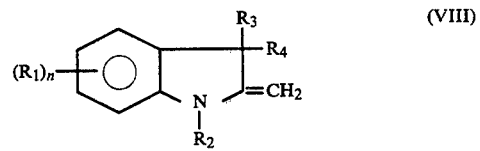

(VIII)

wherein
$R_1$ to $R_4$ and n have the abovementioned meaning, with oxiranes of the formula

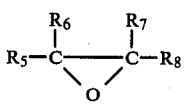

or alcohols of the formula

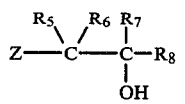

wherein

Z is a leaving group, especially a hydroxyl, mercapto, halogen, $C_1$–$C_4$-alkoxy, $C_1$–$C_4$-alkylmercapto, formyloxy or acetoxy group, a carbonic acid group esterified by methanol or ethanol, a sulphuric acid or phosphoric acid group optionally esterified by methanol or ethanol, a $C_1$–$C_4$-alkylsulphonic acid group or a benzenesulphonic acid group which is optionally substituted by $C_1$–$C_4$-alkyl, and $R_5$ to $R_8$ have the above meaning.

The reaction can be carried out without solvents or in the presence of an organic solvent, preferably at 80°–250° C. Examples of suitable solvents are toluene, xylene, chlorobenzene, dichlorobenzene, tetrahydrofurane or dioxane.

Compounds of the formula (IV) in which X differs from hydroxyl are obtained frm the compounds (IV a) and (IV b) by reaction with acids, acid halides, acid anhydrides or esters of acids, such as sulphuric acid, phosphoric acid, hydrochloric acid, chlorosulphonic acid, phosphorus oxychloride, phosphorus oxybromide, thionyl chloride, dimethyl sulphate, acetyl chloride or acetic anhydride.

The reaction can, for example, be carried out at 20°–100° C. The acid or acid derivative can at the same time serve as the solvent, or a further solvent, such as benzene, toluene, xylene, chlorobenzene, dichlorobenzene, ethylene chloride or chloroform, can be added.

Examples of compounds of the formula (V) are aniline, 2-, 3- and 4-N,N-dimethylamine-aniline, 2-, 3- and 4-amino-toluene, 3- and 4-amino-benzotrifluoride, 3- and 4-amino-1,2-dimethyl-benzene, 2-, 4- and 5-amino-1,3-dimethylbenzene, 4-amino-1,3,5-trimethylbenzene, 2-, 3- and 4-aminoanisole, 2-, 3- and 4-β-hydroxyethoxyaniline, 2-, 3- and 4-amino-phenetole, 2-, 3- and 4-butoxyaniline, 2-amino-1,4-dimethoxybenzene, 2-amino-1,4-diethoxybenzene, 3- and 4-benzyloxyaniline, 2-, 3- and 4-chloroaniline, 2-, 3-and 4-bromoaniline, 2,3-, 2,4-, 2,5- and 3,4-dichloroaniline, 2,5-dibromoaniline, 2,4,5-, 2,4,6-, 3,4,5- and 3,4,6-trichloroaniline, 3-, 4-, 5- and 6-chloro-2-amino-toluene, 4-chloro-3-amino-toluene, 2-chloro-4-amino-toluene, 5-chloro-2-amino-benzotrifluoride, 4,5- and 4,6-dichloro-2-amino-toluene, 2,5- and 4,6-dichloro-3-amino-toluene, 2,5- and 3,5-dichloro-4-amino-toluene, 4,5,6-trichloro-2-amino-toluene, 4-chloro-2-amino-1,3-dimethylbenzene, 6-chloro-3-amino-anisole, 2-chloro-4-amino-anisole, 3-chloro-4-amino-anisole, 2-, 3- and 4-nitroaniline, 3-nitro-4-amino-toluene, 5-nitro-4-amino-1,3-dimethylbenzene, 6-nitro-3-amino-anisole, 3-nitro-4-amino-anisole, 3-nitro-6-amino-anisole, 5-nitro-2-amino-phenetole, 2-nitro-4-amino-phenetole, 3-nitro-4-amino-phenetole, 5-nitro-2-amino-1,4-dimethoxybenzene, 5-nitro-2-amino-1,4-diethoxy-benzene, 2-chloro-4-nitroaniline, 2-bromo-4-nitroaniline, 4-chloro-2-nitroaniline, 4-bromo-2-nitroaniline, 2,6-dichloro-4-nitroaniline, 2-chloro-6-bromo-4-nitroaniline, 2,6-dibromo-4-nitroaniline, 2,4-dinitroaniline, 6-chloro-2,4-dinitroaniline, 6-bromo-2,4-dinitroaniline, 2,4,6-trinitroaniline, 2-, 3- and 4-aminobenzonitrile, 1-amino-2-cyano-5-chloro-benzene, 1-amino-2,5-dichloro-4-cyano-benzene, 2-cyano-4-nitroaniline, 4-cyano-3-nitroaniline, 1-amino-2,4-dicyanobenzene, 1-amino-2,6-dicyano-4-nitrobenzene, 1-amino-2-chloro-4-methylsulphonyl-benzene, 2-methylsulphonyl-4-nitroaniline, 4-methylsulphonyl-2-nitroaniline, 2-, 3- and 4-amino-benzaldehyde, 2-, 3- and 4-amino-acetophenone, 2-amino-5-nitro-acetophenone, 2-, 3- and 4-aminobenzophenone, 2-, 3- and 4-amino-4'-methyl-benzophenone, 2-, 3- and 4-amino-4'-methoxy-benzophenone, 4-amino-5-nitro-benzophenone, 2-, 3- and 4-amino-benzoic acid ehtyl ester, 2-, 3- and 4-amino-benzoic acid n-butyl ester, 2-, 3- and 4-amino-benzoic acid cyclohexyl ester, 2-, 3- and 4-amino-benzoic acid amide, 2-, 3- and 4-amino-benzoic acid monomethylamide, 2-, 3- and 4-amino-benzoic acid dimethylamide, 2-, 3- and 4-amino-benzoic acid ethylamide, 2-, 3- and 4-amino-benzoic acid isopropylamide, 2-, 3- and 4-amino-benzoic acid diethylamide, 2-, 3- and 4-amino-benzoic acid di-n-butylamide, 2-, 3- and 4-amino-benzoic acid morpholide, 2-, 3- and 4-amino-benzoic acid anilide, 2-, 3- and 4-amino-benzoic acid N-methylanilide, 2-, 3- and 4-amino-phenyl-acetic acid methyl ester, 2-, 3- and 4-amino-phenyl-acetic acid ethyl ester, 2-, 3- and 4-amino-phenyl-acetic acid butyl ester, 2-, 3- and 4-amino-phenoxy-acetic acid ethyl ester, 2-, 3- and 4-amino-phenyl-benzoic acid methyl ester, 2-, 3- and 4-amino-phenyl-sulphonic acid methyl ester, 2-, 3- and 4-amino-phenyl-sulphonic acid ethyl ester, 2-, 3- and 4-amino-phenyl-sulphonic-acid β-chloroethyl ester, 2-, 3- and 4-amino-phenyl-sulphonic acid butyl ester, 2-, 3- and 4-amino-phenyl-sulphonic acid n-hexyl ester, 2-, 3- and 4-amino-phenyl-sulphonic acid phenyl ester, 2-, 3- and 4-amino-phenyl-sulphonic acid 4'-methyl-phenyl ester, 2-, 3- and 4-amino-phenyl-sulphonic acid 4'-methoxy-phenyl ester, 2-, 3- and 4-amino-phenyl-sulphonic acid β-ethoxy-ethyl ester, 2-, 3- and 4-aminobenzenesulphonic acid phenyl ester, 2-, 3- and 4-amino-phenyl-cyclohexyl-sulphamic acid ester, 2-, 3- and 4-amino-benzenesulphonic acid amide, 2-, 3- and 4-amino-benzenesulphonic acid monomethylamide, 2-, 3- and 4-amino-benzenesulphonic acid dimethylamide, 2-, 3- and 4-amino-benzenesulphonic acid ethylamide, 2-, 3- and 4-amino-benzenesulphonic acid diethylamide, 2-, 3- and 4-amino-benzenesulphonic acid di-n-butylamide, 2-, 3- and 4-amino-benzenesulphonic acid morpholide, 2-, 3- and 4-amino-benzenesulphonic acid cyclohexylamide, 2-, 3- and 4-amino-benzenesulphonic acid anilide, 2-, 3- and 4-amino-benzenesulphonic acid N-methyl-anilide, 1-methyl-2-amino-benzene-4-sulphonic acid amide, 1-methoxy-2-amino-benzene-4-sulphonic acid amide, 1-methoxy-2-amino-benzene-4-sulphonic acid N-methylanilide, 1-chloro-2-amino-benzene-4-sulphonic acid dimethylamide, 1-chloro-2-amino-benzene-5-sulphonic acid β-ethoxy-ethylamide, 1-chloro-3-amino-benzene-4-sulphonic acid amide, 1-chloro-4-amino-benzene-2-sulphonic acid dimethylamide, 4-amino-benzene-methylurethane, 2-, 3- and 4-amino-acetanilide, 2-, 3- and 4-amino-phenoxyacetanilide, 2-, 3- and 4-amino-N-methyl-acetanilide, 4-amino-diphenyl, 4-amino-diphenyl-4'-carboxylic acid ethyl ester, 4-amino-4'-acetylamino-diphenyl, 4-amino-diphenylmethane, 4-amino-2',4'-dinitro-diphenylamine, 4-amino-4'-methyldiphenylamine, 4-amino-3-nitro-diphenylamine-4'-sulphonic acid amide, 1-amino-naphthalene, 1-amino-5-ethoxy-naphthalene, 2-chloro-1-amino-naphthalene, 2-amino-naphthalene, 2-amino-naphthalene-6-sulphonic acid dimethyl-amide, 5-nitro-2-amino-thiazole, 4-amino-azo-benzene, 2',3-dimethyl-4-amino-azo-benzene, 2-methyl-4-amino-5-methoxy-azo-benzene, phenyl-azo-4-amino-naphthalene, 2-amino-3- and 5-nitrothiazole, 2-amino-4-methyl-5-nitrothiazole, 2-amino-5-phenyl-1,3,4-thiadiazole, 3-phenyl-5-amino-1,2,4-thiadiazole, 3-amino-1,2,4-triazole, 5-amino-benzotriazole, 2-amino-benzothiazole, 2-amino-6-methoxy- or -ethoxybenzothiazole, 2-amino-6-chloro- or 6-nitrobenzothiazole, 2-amino-5,6-dichlorobenzothiazole, 2-amino-6-methylsulphenylbenzothiazole, 3-amino-5-nitro-2,1-benzisothiazole and 3-amino-5-nitro-7-chloro- and bromobenzisothiazole.

Suitable compounds (VII) are the hydrazines corresponding to the abovementioned amines.

Examples of suitable compounds (VIII) are: 1,3,3-trimethyl-2-methylene-2,3-dihydroindole, 1,3,3,5-tetramethyl-2-methylene-2,3-dihydroindole, 1,3,3-trimethyl-5-chloro-2-methylene-2,3-dihydroindole, 1,3,3-trimethyl-5-methoxy-2-methylene-2,3-dihydroindole, 1,3,3-trimethyl-5-carbomethoxy-2-methylene-2,3-dihydroindole, 1,3,3-trimethyl-5-carboethoxy-2-methylene-2,3-dihydroindole, 1,3,3-trimethyl-5-cyclohexyl-2-methylene-2,3-dihydroindole, 1,3,3-trimethyl-5-benzyl-2-methylene-2,3-dihydroindole, 1,3,3-trimethyl-7-methyl-2-methylene-2,3-dihydroindole, 1,3,3-trimethyl-5-trifluoromethyl-2-methylene-2,3-dihydroindole, 1,3,3-trimethyl-7-methoxy-2-methylene-2,3-dihydroindole, 1,3,3-trimethyl-7-chloro-2-methylene-2,3-dihydroindole, 1-ethyl-3,3-dimethyl-2-methylene-2,3-dihydroindole, 1-ethyl-3,3,5-trimethyl-2-methylene-2,3-dihydroindole, 1-ethyl-3,3-dimethyl-5-chloro-2-methylene-2,3-dihydroindole, 1-ethyl-3,3-dimethyl-5-methoxy-2-methylene-2,3-dihydroindole, 1-ethyl-3,3-dimethyl-5-carbomethoxy-2-methylene-2,3-dihydroindole, 1-ethyl-3,3-dimethyl-5-carboethoxy-2-methylene-2,3-dihydroindole, 1-ethyl-3,3,7-trimethyl-5-cyclohexyl-2-methylene-2,3-dihydroindole, 1-ethyl-3,3-dimethyl-5-benzyl-2-methylene-2,3-dihydroindole, 1-benzyl-3,3-dimethyl-2-methylene-2,3-dihydroindole, 1-phenyl-3,3-dimethyl-2-methylene-2,3-dihydroindole, 1,3,3-trimethyl-4-benzyl-2-methylene-2,3-dihydroindole, 1,3,3-trimethyl-6-benzyl-2-methylene-2,3-dihydroindole, 1,3,3-trimethyl-7-benzyl-2-methylene-2,3-dihydroindole, 1,3,3-trimethyl-5-fluoro-2-methylene-2,3-dihydroindole, 1,3,3-trimethyl-5-ethoxy-2-methylene-2,3-dihydroindole, 1,3,3-trimethyl-7-ethoxy-2-methylene-2,3-dihydroindole, 1,3,3-trimethyl-5-cyano-2-methylene-2,3-dihydroindole, 1,3,3-trimethyl-5-acetylamino-2-methylene-2,3-dihydroindole, 1,3,3-trimethyl-5-methylsulphonyl-2-methylene-2,3-dihydroindole, 1,3,3-trimethyl-5-sulphonyl-2-methylene-2,3-dihydroindole, 1,3,3-trimethyl-5-sulphonamido-2-methylene-2,3-dihydroindole, 1,3,3-trimethyl-5-carbonamido-2-methylene-2,3-dihydroindole, 1,3,3-trimethyl-5-carboxylic acid ethylanilide-2-methylene-2,3-dihydroindole, 1,3,3-trimethyl-7-chloro-2-methylene-2,3-dihydroindole, 1,3,3-trimethyl-5-chloro-7-methoxy-2-methylene-2,3-dihydroindole, 1,3,3-trimethyl-4-chloro-7-methoxy-2-methylene-2,3-dihydroindole, 1,3,3-trimethyl-4,6-dicarbomethoxy-2-methylene-2,3-dihydroindole, 1,3,3-trimethyl-4,5-dichloro-7-methoxy-2-methylene-2,3-dihydroindole, 1,3,3-trimethyl-5-chloro-4,7-dimethoxy-2-methylene-2,3-dihydroindole, 1,3,3,4,5,7-hexamethyl-2-methylene-2,3-dihydroindole, 1,3,3,4,6,7-hexamethyl-2-methylene-2,3-dihydroindole, 1-cyanoethyl-3,3-dimethyl-2-methylene-2,3-dihydroindole, 1-carbonamidoethyl-3,3-dimethyl-2-methylene-2,3-dihydroindole, 1-allyl-3,3-dimethyl-2-methylene-2,3-dihydroindole, 1-phenethyl-3,3-dimethyl-2-methylene-2,3-dihydroindole or 1-chloroethyl-3,3-dimethyl-2-methylene-2,3-dihydroindole.

Examples of oxiranes of the formula (IX) which can be used according to the invention are: ethylene oxide, propylene oxide, 1,2-butylene oxide, 2,3-butylene oxide, 1-chloro-2,3-epoxypropane, 1-methoxy-2,3-epoxypropane, 1-ethoxy-2,3-epoxypropane, 1-n-propoxy-2,3-epoxypropane, 1-isopropoxy-epoxypropane, 1-n-butoxy-2,3-epoxypropane, 1-isobutoxy-2,3-epoxypropane, 1-tert.-butoxy-2,3-epoxypropane, 1-n-pentoxy-2,3-epoxypropane, 1-isopentoxy-2,3-epoxypropane, 1-n-hexoxy-2,3-epoxypropane, 1-(2'-ethyl-n-hexoxy)-2,3-epoxypropane, 1-n-octyloxy-2,3-epoxypropane, 1-n-nonyloxy-2,3-epoxypropane, 1-n-decyloxy-2,3-epoxypropane, 1-n-undecyloxy-2,3-epoxypropane, 1-n-dodecyloxy-2,3-epoxypropane, 1-n-hexadecyloxy-2,3-epoxypropane, 1-n-octadecyl-2,3-epoxypropane, 1-dimethylamino-2,3-epoxypropane, 1-diethylamino-2,3-epoxypropane, 1-di-n-butylamino-2,3-epoxypropane, 1-phenoxy-2,3-epoxypropane, 1-(p-nitrophenoxy)-2,3-epoxypropane, 1-(p-methylphenoxy)-2,3-epoxypropane, 1-(m-methylphenoxy)-2,3-epoxypropane, 1-(o-methylphenoxy)-2,3-epoxypropane, 1-(nonylphenoxy)-2,3-epoxypropane, 1-(dodecylphenoxy)-2,3-epoxypropane, styrene oxide, allyloxy-2,3-epoxypropane, propargyloxy-2,3-epoxypropane, 2,3-epoxy-1-propanol, 1,2-epoxydecane, 1,2-epoxy-3-(4-methylphenylmercapto)-propane, benzoic acid 2,3-epoxypropyl ester, N-(2,3-epoxypropyl)-pyrrolidine, 3-(diallylamino)-1,2-epoxypropane, 3,3,3-trichloro-1,2-epoxypropane, 3,3,3-trifluoro-1,2-epoxypropane, 3,4-epoxy-1-butene, 1,2-epoxy-3(4-methylphenyl)-propane, 1,2-epoxy-3-(4-methoxyphenyl)-propane and cyclohexene oxide.

The new dyestuffs can be used for dyeing and printing materials of leather, wool, cotton, cellulose, synthetic fibres, fibres containing lignin, and paper. Furthermore, they can be used for the production of writing fluids, rubber-stamp inks and ball-pen pastes, and can also be used in flexographic printing.

In particular, the dyestuffs according to the invention which are free from sulphonic acid groups are suitable for dyeing—from an aqueous liquor or from organic solvents—and printing of filaments, tapes, woven fabrics or knitted fabrics of polyacrylonitrile or of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides and asymmetrical dicyanoethylene, or flock, fibres, filaments, tapes, woven fabrics and knitted fabrics of acid-modified aromatic polyesters and acid-modified polyamide. Acid-modified aromatic polyesters are, for example, polycondensation products of sulphoterephthalic acid and ethylene glycol, that is to say polyethylene glycol terephthalates containing sulphonic acid groups, such as are described in Belgian Pat. No. 549,179 and in U.S. Pat. 2,893,816. Acid-modified polyamides are described, for example, in U.S. Pat. Nos. 3,039,990 and 3,454,351.

The dyeing can, as is usual with cationic dyestuffs, be carried out from a neutral or acid aqueous liquor at 40°–100° C., or under pressure at above 100° C. It can be carried out in the presence of the customary auxiliaries, for example in the presence of retarders such as dodecyldimethylbenzylammonium chloride, or of non-ionic auxiliaries such as stearyl alcohol with 50 mols of ethylene oxide, or dyeing accelerators such as benzyloxypropionitrile.

Those dyestuffs which are readily soluble in organic solvents can also be employed for dyeing from organic solvents, for example chlorohydrocarbons.

When used for printing the polymers mentioned, customary auxiliaries, such as wetting agents and thickeners, are added to the printing inks.

The dyeings and prints are distinguished by high brilliance, great depth of colour and a high level of fastness properties, in particular good fastness to light.

The new dyestuffs of the formula I in which A contains a sulphonic acid group can be used for printing paper. The dyestuffs of the formula I in which A contains 2 or 3 sulphonic acid groups can be used for dyeing and printing wool, polyamide fibres, cotton, cellulose or paper.

The parts mentioned in the examples which follow are parts by weight.

EXAMPLE 1

9.3 parts of aniline in 30 parts of glacial acetic acid and 20 parts of 10% strength hydrochloric acid were diazotised, at 0°–5° C., with 7 parts of sodium nitrite in 20 parts of water. After 10 minutes, 2 g of amidosulphonic acid were added and the solution was introduced into a solution of 23.8 parts of 1,3,3-trimethyl-2-(3-chloropropylidene-1)-indoline (see Example F) in 50 parts of alcohol at room temperature. The mixture was stirred for another 10 minutes and the dyestuff was precipitated with 250 parts of a concentrated sodium acetate solution and 100 parts of concentrated sodium chloride solution, filtered off and dried in vacuo at 70° C. The dyestuff has the formula

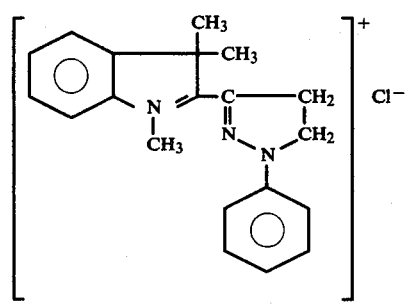

and dyes polyacrylonitrile fibres in orange shades having very good fastness properties.

Table I contains components which can be converted to the corresponding dyestuffs in accordance with Example 1.

Table I–III show the color shade on polyacrylonitrile fibres.

Table I

| Indoline | Diazo component | Colour shade |
|---|---|---|
| 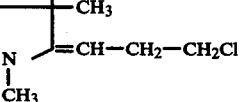 | 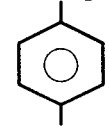 | red-orange |
| " |  | " |
| 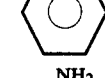 | 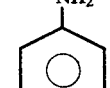 | " |
| " |  | red |

Table I-continued

| Indoline | Diazo component | Colour shade |
|---|---|---|
| [structure: 5-methoxy-1,3,3-trimethyl-2-(3-chlorobut-1-enyl)indoline] | [structure: aniline] | " |
| [structure: 1,3,3-trimethyl-2-(3-chloropropenyl)indoline] | [structure: 4-amino-3-methoxyaniline / 4-amino-2,5-dichlorobenzonitrile] | golden yellow |
| " | [structure: 2-chloroaniline] | " |
| " | [structure: 5-amino-3-phenyl-1,2,4-thiadiazole] | yellow |
| [structure: 2-(3-bromopropenyl)-1,3,3-trimethylindoline] | [structure: 4-amino-toluene (p-toluidine)] | scarlet |
| " | [structure: 2-methylaniline (o-toluidine)] | " |
| " | [structure: 2-methoxy-4-nitroaniline] | " |
| [structure: 1,3,3-trimethyl-2-(3-chloropropyl)indoline] | [structure: 3-amino-9-ethylcarbazole] | violet |
| " | [structure: 2-chloro-5-trifluoromethylaniline] | yellow |
| [structure: 1,3,3-trimethyl-2-(3-chloropropenyl)indoline] | [structure: 7-amino-1-ethyl-3-phenyl-3,4-dihydroquinolin-2(1H)-one] | bluish-tinged red |

Table I-continued

| Indoline | Diazo component | Colour shade |
|---|---|---|
| (1,3,3-trimethylindoline with =CH–C(CH₃)(CH₂CH₂CH₂CH₂)C–Cl substituent at 2-position) | 4-methoxyaniline (NH₂–C₆H₄–OCH₃) | " |
| 1,3,3-trimethylindoline with =CH–CH₂–CHCl–CH₂–O–C₆H₅ at 2-position | aniline (NH₂–C₆H₅) | orange |
| 1,3,3-trimethylindoline with =CH–CH₂–CHCl–CH₂–OCH₃ at 2-position | 4-nitroaniline (NH₂–C₆H₄–NO₂) | " |
| 1,3,3-trimethylindoline with =CH–CH₂–CHCl–CH₂–OC₂H₅ at 2-position | 4-methylaniline (NH₂–C₆H₄–CH₃) | scarlet |
| 5-nitro-1,3,3-trimethylindoline with =CH–CH₂–CH₂–Cl at 2-position | 4-methylaniline (NH₂–C₆H₄–CH₃) | red |
| " | 4-methyl-4'-methoxy biphenyl amine | bluish-tinged red |
| 5-nitro-1,3,3-trimethylindoline with =CH–CH₂–CH₂–Cl at 2-position | 4-chloroaniline (NH₂–C₆H₄–Cl) | red |
| 5-nitro-1,3,3-trimethylindoline with =CH–CH₂–CHCl–CH₂ at 2-position | aniline (NH₂–C₆H₅) | " |

EXAMPLE 2

44 parts of 1,3,3-trimethyl-indoline-2-spirohydrofurane or 1,3,3-trimethyl-2-(3-oxypropylidene-1)-indoline (see Example A₁) were added dropwise, with good stirring, to 35 parts of phosphorus oxychloride at 60°–70° C. The mixture was stirred for 2 hours at 80° C. and the batch was introduced into 250 parts of ice water and stirred for a further hour at 20°–25° C. A diazonium salt solution from 27.6 parts of 4-nitroaniline, 60 parts of glacial acetic acid, 40 parts of 10% strength hydrochloric acid, 14 parts of sodium nitrite and 40 parts of water was added to this solution and the dyestuff was precipitated with 150 parts of concentrated sodium acetate solution and 200 parts of concentrated sodium chloride solution.

The dyestuff has the formula

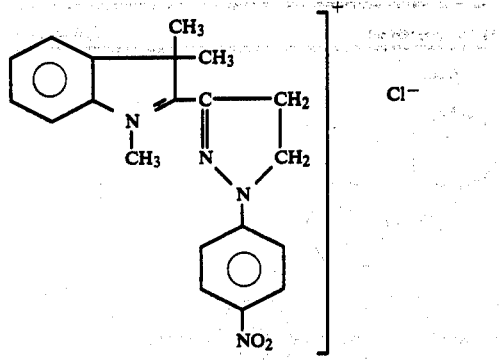
and dyes polyacrylonitrile fibres in orange shades having excellent fastness properties.
The following components were reacted analogously to Example 2.
Table II
| Indoline | Diazo component | Colour shade |
|---|---|---|
| | | red-orange |
| | | scarlet |
| | | " |
| | | " |
| | | red |
| | | " |

Table II-continued

| Indoline | Diazo component | Colour shade |
|---|---|---|
| " | 4-benzyloxyaniline | " |
| 5-chloro-1,3,3-trimethyl-2-(3-hydroxypropylidene)indoline or its cyclic hemiketal form | 4-amino-4'-methyl-diphenylamine | blue |
| 1,3,3-trimethyl-2-(3-hydroxypropyl)indoline or its cyclic hemiketal form | 2,4-dimethoxyaniline | bluish-tinged red |
| " | 4-amino-azobenzene | " |
| 1,3,3-trimethyl-2-(2-hydroxypropyl)indoline or its cyclic hemiketal form | 4-(2-hydroxyethoxy)aniline | red |
| " | 4-(2-hydroxyethoxycarbonyl)aniline | orange |
| " | 4-nitroaniline | " |
| 5-chloro-1,3,3-trimethyl-2-(3-methylbutylidene)indoline or its cyclic hemiketal form | 4-methylaniline | scarlet |

Table II-continued

| Indoline | Diazo component | Colour shade |
|---|---|---|
| " | 4-methoxyaniline (H₂N–C₆H₄–OCH₃) | red |
| CH₃OOC-indoline with =CH–CH(CH₃)–CH–CH₃ substituent, or CH₃OOC-indoline with spiro CH₂–CH₂–O–CH₃ group | 4-methylaniline (H₂N–C₆H₄–CH₃) | scarlet |

EXAMPLE 3

12.3 parts of 4-anisidine were dissolved in 30 parts of glacial acetic acid and 20 parts of 10% strength hydrochloric acid and diazotised, at 0°–5° C., with 7 parts of sodium nitrite in 20 parts of water, and the diazonium salt solution was added to a solution of 29.7 parts of 1,3,3-trimethyl-3-(3-sulphoxy-propylidene-1)-indoline (see Example D₁) in 70 parts of water at room temperature. 250 parts of concentrated sodium acetate solution were then added and the batch was warmed to 50°–60° C. for 30 minutes. It was cooled to room temperature and the dyestuff was precipitated with 100 parts of concentrated sodium chloride solution, filtered off and dried in vacuo at 70° C.

The dyestuff has the formula

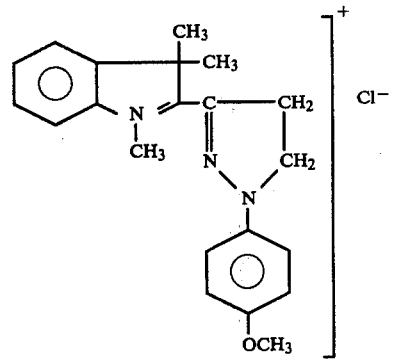

and dyes polyacrylonitrile fibres in yellowish-tinged red shades having very good fastness properties.

The following components were reacted analogously to Example 3.

Table III

| Indoline | Diazo component | Colour shade |
|---|---|---|
| 1,3,3-trimethylindoline =CH–CH₂–CH(CH₃)–O–SO₃H | aniline (NH₂–C₆H₄) | orange |
| " | 4-methylaniline | " |
| " | 2-methylaniline | " |

Table III-continued

| Indoline | Diazo component | Colour shade |
|---|---|---|
| Cl-[5-chloro-1,3,3-trimethyl-2-(CH=CH₂—CH₂—O—SO₃H)-indoline] | 4-butoxyaniline (NH₂–C₆H₄–OC₄H₉) | red |
| " | 4-methylaniline (NH₂–C₆H₄–CH₃) | scarlet |
| O₂N-[5-nitro-1,3,3-trimethyl-2-(=CH—CH₂—CH₂—O—SO₃H)-indoline] | 4-bromoaniline (NH₂–C₆H₄–Br) | " |
| " | aniline (NH₂–C₆H₅) | " |

EXAMPLE 4

9.3 parts of aniline were dissolved in 30 parts of glacial acetic acid and 20 parts of 10% strength hydrochloric acid and diazotised, at 0°–5° C., with 7 parts of sodium nitrite in 20 parts of water; the solution was introduced into a solution of 26.5 parts of 1,3,3-trimethyl-5-chloro-2-spiro-2'-methyl-hydrofurane (Example B) in 50 parts of alcohol at room temperature, the mixture was stirred for a further 10 minutes and the dyestuff of the formula

[structure: 5-chloro-1,3,3-trimethyl-2-(=C(–N=N–C₆H₅)–CH₂–CH(CH₃)–OH)-indoline]

was precipitated with 250 parts of concentrated sodium acetate solution, filtered off and dried in vacuo at 70° C.

18.5 parts of this azo compound were dissolved in 70 parts of toluene, 7.8 parts of phosphorus oxychloride were added and the batch was heated to 60°–70° C. for 3 hours. It is then cooled and the dyestuff is filtered off, rinsed with toluene and dried in vacuo at 50° C. It has the formula

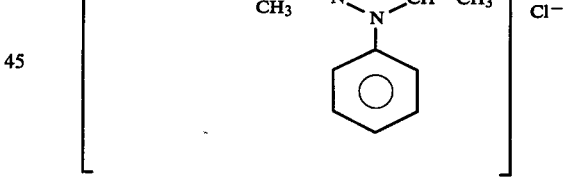

and dyes polyacrylonitrile in red-orange shades having very good fastness properties.

EXAMPLE 5

40.7 parts of 4'-amino-2,5'-dimethylazobenzene-2,5-disulphonic acid were dissolved in 70 parts of water and 10 parts of 10% strength sodium hydroxide solution. 7 parts of sodium nitrite in 20 parts of water were then added, and 30 parts of 10% strength hydrochloric acid were added dropwise at 0°–5° C. After 10 minutes, 2 parts of amidosulphonic acid were added. This solution was introduced into a solution of 23.8 parts of 1,3,3-trimethyl-2-(3-chloropropylidene-1)-indoline (see Example F) in 50 parts of alcohol at room temperature. The mixture was stirred for a further 10 minutes and the dyestuff was precipitated with sodium acetate and sodium sulphate, filtered off and dried in vacuo at 70° C. The dyestuff has the formula

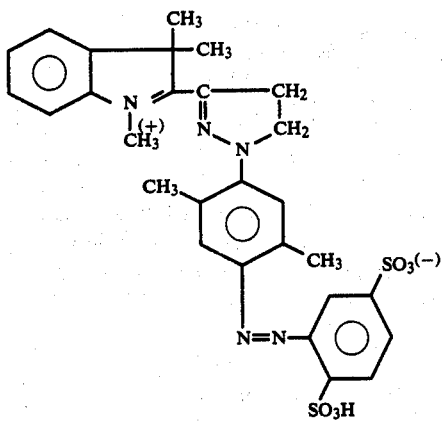

and dyes polyamide fibres in clear red shades.

The following dyestuffs were prepared analogously to Example 5.

Table IV

| Indoline | Diazo component | Colour shade |
|---|---|---|
| [structure: indoline with =CH—CH₂—CH₂—Cl] | [structure: benzothiazole with SO₃H groups and NH₂] | orange |
| " | [structure: naphthalene-azo with CH=CH and NH₂, SO₃H groups] | bluish-tinged red |
| " | [structure: aniline with NH₂ and two SO₃H groups] | yellow |
| " | [structure: aniline with NH₂, SO₃H, CH₃] | " |
| " | [structure: aniline with NH₂, SO₃H, NO₂] | orange | and recrystallised from water. The compound is identical with the dyestuff from Example 2.

If, in the above example, 34.1 parts of the compound of the formula H are used in place of the compound of the formula G, the same dyestuff is obtained.

EXAMPLE 7

Using a liquor ratio of 1:40, polyacrylonitrile fibres are introduced at 40° C. into an aqueous bath which contains, per liter, 0.75 g of 30% strength acetic acid, 0.38 g of sodium acetate and 0.15 g of the dyestuff described in Example 2. The bath is heated to the boil over the course of 20 to 30 minutes and is kept at this temperature for 30 to 60 minutes. After rinsing and drying, a brilliant orange dyeing is obtained which is distinguished by a very good fastness properties.

EXAMPLE 8

Using a liquor ratio of 1:40, acid-modified polyethylene glycol terephthalate fibres are introduced, at 20° C., into an aqueous bath which contains, per liter, 3 to 10 g of sodium sulphate, 0.1 to 1 g of oleyl polyglycol ether (50 mols of ethylene oxide per mol of oleyl alcohol), 0 to 15 g of dimethylbenzyldodecylammonium chloride and 0.15 g of the dyestuff described in Example 4, and which has been brought to pH 4 to 5 with acetic acid. The bath is heated to 100° C. over the course of 30 minutes and is kept at this temperature for 60 minutes. The fibres are then rinsed and dried. A brilliant scarlet-

EXAMPLE 6

32.6 parts of the compound of the formula G, 15.3 parts of 4-nitrophenylhydrazine, 70 parts of dimethylformamide and 10 parts of glacial acetic acid were heated to 100° C. for one hour, whilst stirring. The batch was then poured into 250 parts of 10% strength sodium chloride solution. The dyestuff was filtered off red dyeing having very good fastness properties is obtained.

EXAMPLE 9

In a 500 ml dyeing beaker placed in a heated water-bath, 0.055 g of the dyestuff described in Example 4 are worked into a paste with a 20-fold amount of hot water, with addition of a little acetic acid, and the paste is then dissolved in hot water. 0.5 g of the reaction product of 50 mols of ethylene oxide with 1 mol of oleyl alcohol is further added to the dyeing liquor which is then made up to 500 ml with cold water. The pH value of the dyeing liquor is brought to 4.5–5 with acetic acid or sodium acetate. 10 g of piece goods of anti-modified polyamide are introduced, at room temperature, into the dyeing liquor prepared in this way. The dyebath is warmed to 100° C. over the course of 15 minutes, whilst constantly agitating the goods being dyed. Dyeing is then carried out for 15 to 20 minutes at the boil. The piece goods are then rinsed with cold water and are finally dried. A scarlet-red dyeing is obtained.

EXAMPLE 10

A polyacrylonitrile fabric is printed with a printing paste which has been prepared as follows:

30 parts of the dyestuff described in Example 2, 50 parts of thiodiethylene glycol, 30 parts of cyclohexanol and 30 parts of 30% strength acetic acid are covered with 330 parts of hot water and the resulting solution is added to 500 parts of crystal gum as the thickener. Finally, 30 parts of zinc nitrate solution are also added. The resulting print is dried, steamed for 30 minutes, and then rinsed. A brilliant orange-coloured print having very good fastness properties is obtained.

EXAMPLE 11

A stock solution is prepared from 15 parts of the dyestuff described in Example 2, 15 parts of polyacrylonitrile and 70 parts of dimethylformamide, and is added to a customary spinning solution of polyacrylonitrile, which is spun in a known manner. An orange dyeing having very good fastness properties is obtained.

EXAMPLE 12

0.1 g of the dyestuff of Example 5 are dissolved in 100 ml of hot water, 5 ml of 10% strength ammonium acetate solution are added and the mixture is diluted to a volume of 500 ml with water. 10 g of polyamide fibres are introduced into the dyebath which is brought to the boil over the course of 20 minutes, 4 ml of 10% strength acetic acid are added and the mixture is kept at the boil for one hour. The fibres are then rinsed and dried at 70° to 80° C. A red dyeing with good fastness properties is obtained.

EXAMPLE A 173 parts of 1,3,3-trimethyl-2-methylene-indoline and 50 parts of glacial acetic acid were heated under nitrogen to 140°–150° C. in an autoclave. Ethylene oxide was passed in, whilst stirring, until the mixture was saturated (about 88 parts in 4 hours. The mixture was stirred for a further 2 hours, the autoclave was flushed with nitrogen and the product was distilled in vacuo. The compound boils at 125°–128° C./0.8 mm Hg and has the formula

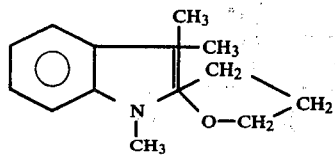

In place of 1,3,3-trimethyl-2-methylene-indoline, 202 parts of 1,3,3-trimethyl-2-methylene-5-methoxy-indoline can be employed. A compound of boiling point 152°–156° C./0.1 mm Hg, having the formula

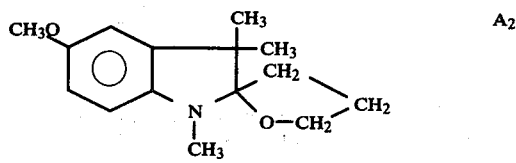

is obtained.

EXAMPLE B 173 parts of 1,3,3-trimethyl-2-methylene-indoline, 17 parts of glacial acetic acid and 116 parts of propylene oxide were heated in an autoclave for 5 hours to 200° C., whilst stirring. The product was distilled in vacuo. The compound boils at 128°–130° C./0.6 mm Hg and has the formula

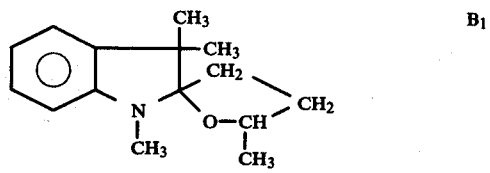

If 207 parts of 1,3,3-trimethyl-2-methylene-5-chloro-indoline are employed in place of 1,3,3-trimethyl-2-methylene-indoline, a compound of boiling point 135°–138° C. at 1.5 mm Hg, having the formula

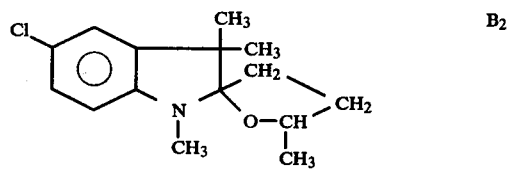

is obtained.

EXAMPLE C 207 parts of 1,3,3-trimethyl-2-methylene-5-chloro-indoline, 20 parts of glacial acetic acid and 300 parts of phenoxypropylene oxide were heated for 10 hours to 200° C. in an autoclave. Glacial acetic acid and unconverted phenoxypropylene oxide were distilled off into vacuo at 16 mm Hg. The residue was stirred into 300 parts of methanol and the product was filtered off. The compound has a melting point of 106° C., and possesses the formula

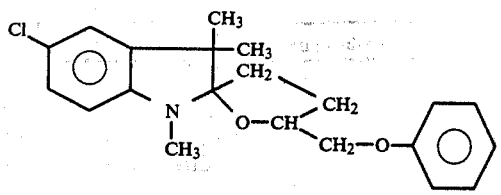

C₁

If in place of 1,3,3-trimethyl-2-methylene-5-chloroindoline, 1,3,3-trimethyl-2-methylene-indoline is employed, a compound of melting point 71°–73° C., having the formula

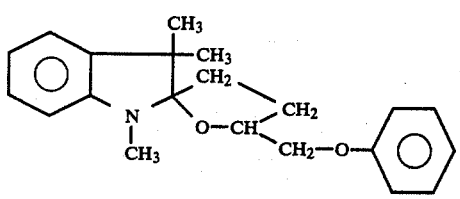

C₂ is obtained.

If the same indoline, and 125 parts of allyloxypropylene oxide in place of phenoxypropylene oxide, are employed, a compound of boiling point 140°–143° C./0.2 mm Hg, having the formula

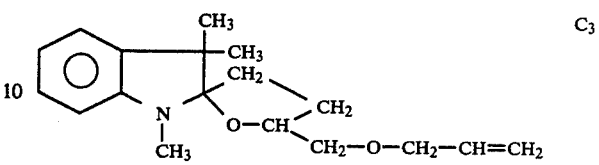

C₃ is obtained.

The following compounds were prepared analogously to Example C:

Table V

| Indoline | Oxirane | Indolinespirohydrofurane |
|---|---|---|

Table V-continued

| Indoline | Oxirane | Indolinespirohydrofurane |
|---|---|---|
| 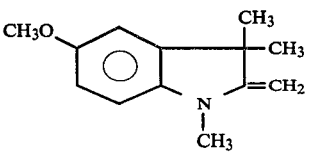 | 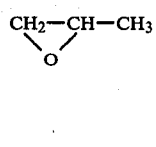 | b.p. 137°–140° C.; 0.8 mm Hg<br>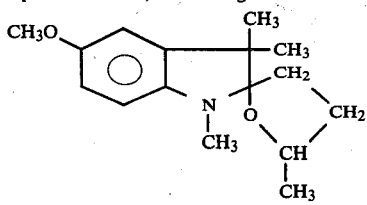 |
| 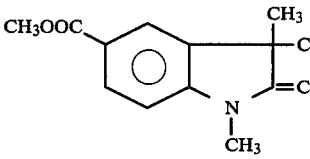 | 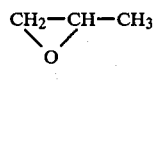 | b.p. 157°–160° C.; 2 mm Hg<br>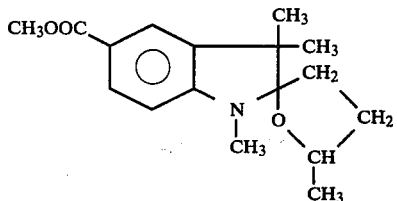
b.p. 182°–185° C.; 0.3 mm Hg |

EXAMPLE D 110 parts of 1,3,3-trimethyl-2-methylene-5-nitro-indoline, 70 parts of glacial acetic acid, 300 parts of dichlorobenzene and 160 parts of propylene oxide were heated to 200° C. for 10 hours in an autoclave. Glacial acetic acid and dichlorobenzene were distilled off at 16 mm Hg and the residue was recrystallised from 300 parts of methanol.

The compound melts at 140°–145° C. and has the formula:

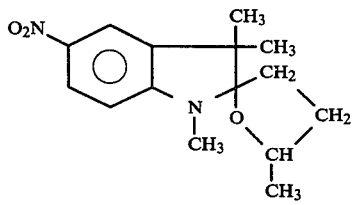   D

EXAMPLE E 434 parts of the compound of the formula A were dissolved in 3,000 parts of ethylene chloride. 240 parts of chlorosulphonic acid were added dropwise at 0°–5° C. The mixture was stirred for a further 5 hours at room temperature and the product was filtered off, rinsed with 1,000 parts of ethylene chloride and dried in vacuo. The compound melts at 215°–217° C. and has the formula

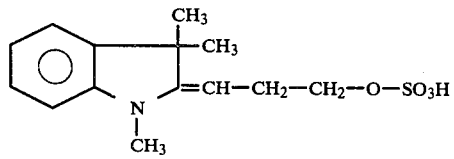   E₁

If, in this batch, the compound of the formula C is used in place of the compound of the formula A, a compound of melting point 185°–187° C., having the formula

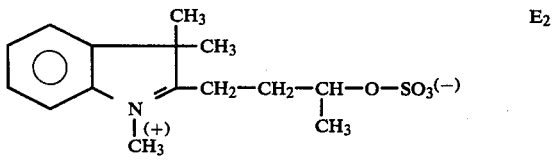   E₂ is obtained.

EXAMPLE F 250 parts of the compound of the formula A₁ were added dropwise to 335 parts of phosphorus oxychloride at 70° C., whilst stirring. The mixture was stirred for a further 3 hours at 70° C. and the batch was poured onto 3,500 parts of ice and brought to pH 5 with 740 parts of sodium hydroxide solution (45% strength). The batch was then extracted by shaking with 2,500 parts of toluene and the toluene was separated off, washed with 2,000 parts of water and distilled in vacuo under nitrogen. A compound of boiling point 149°–152° C./0.8 mm Hg, having the formula

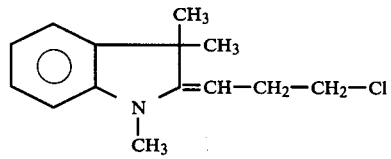   F is obtained.

The following compounds were prepared analogously to Example E:

Table VI

| Indolinespirohydrofurane | Sulphuric acid ester |
|---|---|

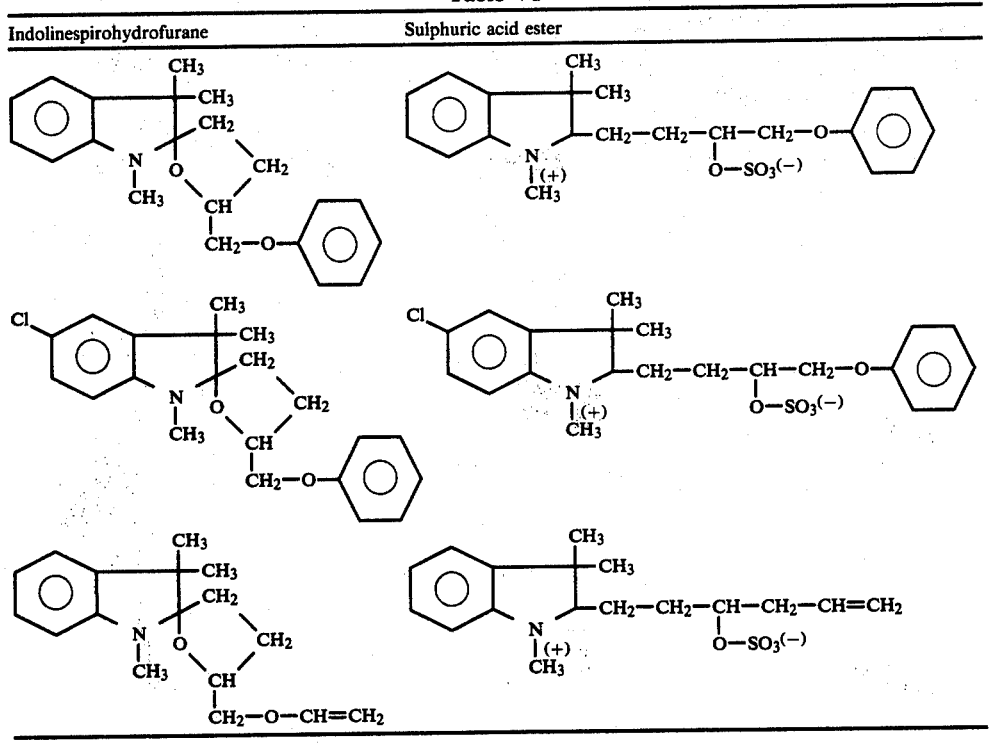

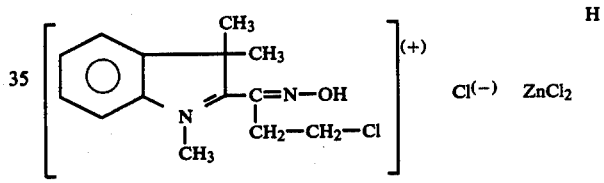

EXAMPLE G 29.7 parts of the compound of the formula $E_1$ were stirred into 70 parts of water. 7 parts of sodium nitrite in 20 parts of water were added at room temperature. 20 parts of glacial acetic acid were then added dropwise, the mixture was stirred for a further 30 minutes and the nitroso compound was filtered off and dried in vacuo at 40° C. The compound melts at 157°–160° C. and has the formula

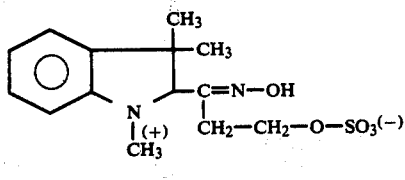

G

EXAMPLE H 25.5 parts of the compound of the formula F were dissolved in 50 parts of glacial acetic acid and 10 parts of concentrated hydrochloric acid and 7 parts of sodium nitrite in 20 parts of water were added at 0°–10° C., whilst stirring. The mixture was stirred for a further 10 minutes and the product was precipitated with concentrated sodium chloride solution and zinc chloride solution. The compound melts at 100°–113° C. and has the formula

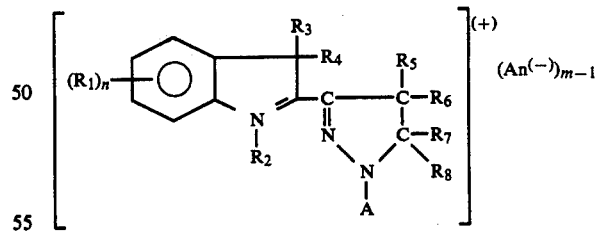

H

Figure 2:
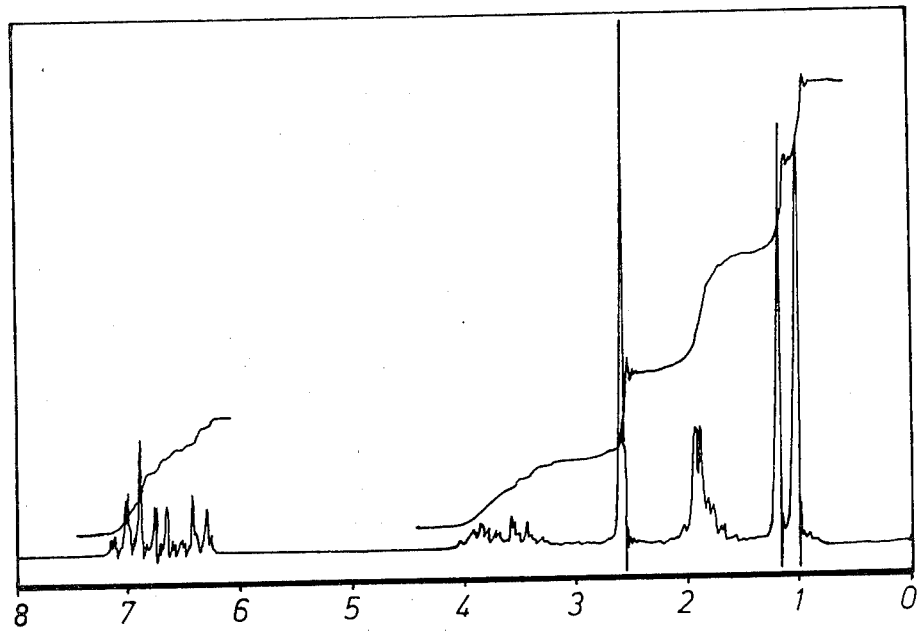
Figure 3:
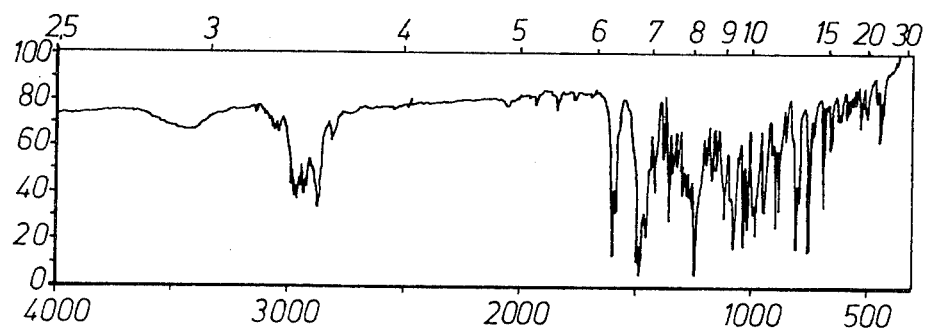
Figure 4:
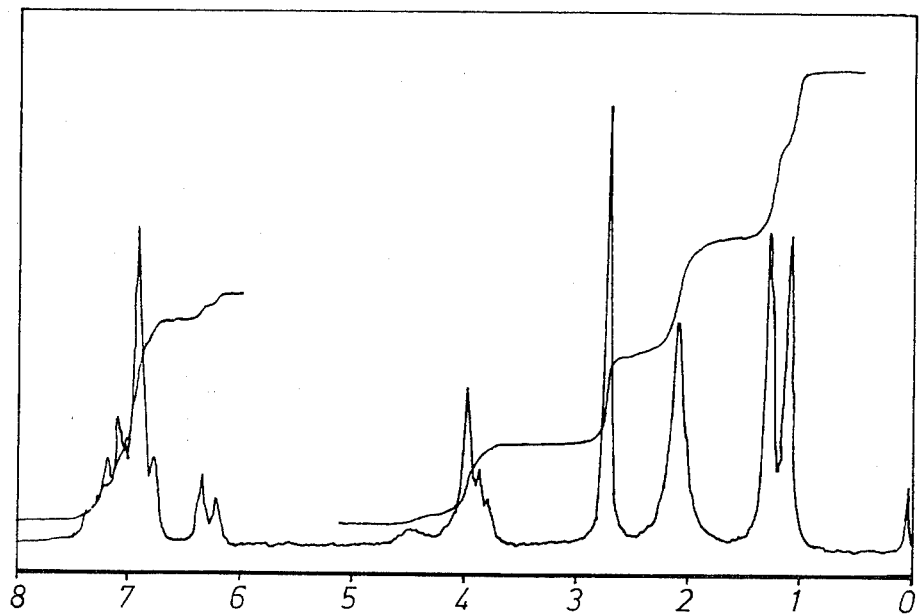

The IR and NMR spectra of compound A, appears in FIGS. 1 and 2, respectively. The IR and NMR spectra of compound C, appears in FIGS. 3 and 4, respectively.

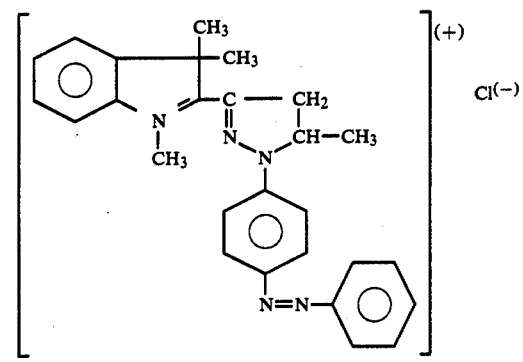

I claim:

1. Methine dyestuff of the formula wherein
$R_1$ is halogen, $C_1$–$C_6$ alkyl; $C_1$–$C_6$-alkyl substituted with carboxyl, hydroxyl, halogen, $C_1$–$C_4$-alkoxy, cyano, $C_1$–$C_4$-alkoxy-carbonyl, or carboxylic acid amide; cyclopentyl or cyclohexyl unsubstituted or substituted with halogen or $C_1$–$C_6$-alkyl; benzyl, 2-phenylethyl or 2-phenylpropyl-(2) unsubstituted or substituted in the phenyl nucleus with halogen, cyano, nitro, $C_1$–$C_4$-alkoxy or $C_1$–$C_6$-alkyl; nitro; cyano; $C_1$–$C_3$-alkylcarbonyl; $C_1$–$C_3$-alkyl-sulphonyl; benzoyl; $C_1$–$C_3$-alkylcarbonylamino; $C_1$–$C_3$-alkylsulphonylamino, benzoylamino; amino;

aminocarbonyl; aminosulphonyl; phenylsulphonyl; naphthylsulphonyl; $C_1$–$C_4$-alkoxy; phenoxy; naphthoxy; benzyloxy; 2-phenylethoxy; 2-phenylpropoxy; carboxyl; $C_1$–$C_4$-alkoxycarbonyl; phenoxycarbonyl; naphthoxycarbonyl; benzyloxycarbonyl; 2-phenylethoxycarbonyl; 2-phenylpropoxycarbonyl; phenylazo or phenylazo substituted with carboxyl, halogen, cyano, nitro, $C_1$–$C_6$-alkyl or $C_1$–$C_4$-alkoxy;

$R_2$ is $C_1$–$C_6$-alkyl unsubstituted or substituted with carboxyl, halogen, hydroxyl, $C_1$–$C_4$-alkoxy, cyano, $C_1$–$C_4$-alkoxycarbonyl, or carboxylic acid amide; $C_2$–$C_6$-alkenyl unsubstituted or substituted with halogen; cyclopentyl or cyclohexyl unsubstituted or substituted with halogen or $C_1$–$C_4$-alkyl; phenyl or naphthyl unsubstituted or substituted with halogen, carboxyl, cyano, nitro, $C_1$–$C_6$-alkyl or $C_1$–$C_4$-alkoxy; or benzyl, 2-phenylethyl or 2-phenylpropyl-(2) unsubstituted or substituted in the phenyl nucleus with halogen, cyano, nitro, $C_1$–$C_4$-alkoxy, or $C_1$–$C_6$-alkyl;

$R_3$ and $R_4$ are $C_1$–$C_6$-alkyl unsubstituted or substitued with carboxyl, halogen, hydroxyl, $C_1$–$C_4$-alkoxy, cyano, $C_1$–$C_4$-alkoxycarbonyl, or carboxylic acid amide; cyclopentyl or cyclohexyl unsubstituted or substituted with halogen or $C_1$–$C_6$-alkyl; or benzyl, 2-phenylethyl or 2-phenylpropyl-(2) unsubstituted or substituted in the phenyl nucleus with halogen, cyano, nitro, $C_1$–$C_4$-alkoxy or $C_1$–$C_6$-alkyl;

$R_5$, $R_6$, $R_7$ and $R_8$ are $R_3$ or $R_4$; or hydrogen; or phenyl or naphthyl unsubstituted or substituted with carboxyl, halogen, cyano, nitro, $C_1$–$C_6$-alkyl, or $C_1$–$C_4$-alkoxy; or $R_6$ and $R_7$ form a cyclohexane ring;

A is phenyl or naphthyl unsubstituted or substituted with halogen, cyano, nitro, $C_1$–$C_6$-alkyl, trifluoromethyl, phenyl, benzyl, $C_1$–$C_4$-alkoxy, phenoxy, benzyloxy, $C_1$–$C_4$-alkoxy, mono- or di-$C_1$–$C_4$-alkylamino, phenylamino, benzylamino, $C_1$–$C_3$-alkylcarbonylamino, formyl, $C_1$–$C_3$-alkylcarbonyl, benzoyl, carboxyl, $C_1$–$C_4$-alkoxycarbonyl, phenyloxycarbonyl, $C_1$–$C_4$-alkoxycarbonyl-methyl or -ethyl, aminocarbonyl, mono- or di-$C_1$–$C_4$-alkylaminocarbonyl, $C_1$–$C_4$-alkylsulphonyl, phenylsulphonyl, $C_1$–$C_4$-alkyl- or phenyloxysulphonyl, aminosulphonyl, mono- or di-$C_1$–$C_4$-alkylaminosulphonyl, $C_1$–$C_4$-alkoxycarbonylamino, $C_1$–$C_4$-alkylaminocarbonylamino, sulpho, phenylazo or phenylazo substituted with carboxyl, halogen, cyano, nitro, $C_1$–$C_6$-alkyl or $C_1$–$C_4$-alkoxy; and wherein $R_1$ is phenylazo or substituted phenylazo or A is phenyl or naphthyl substituted with phenylazo or substituted phenylazo;

n is 0, 1 or 2; and m is 1 or 2, but is 1 only if A is substituted with sulpho.

2. Dyestuff of claim 1, wherein m is 2.

3. Methine dyestuff of claim 1 of the formula

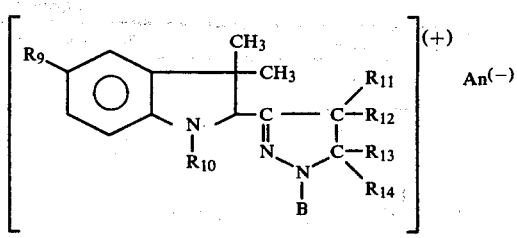

wherein $R_9$ denotes hydrogen, $C_1$–$C_4$-alkyl, trifluoromethyl, chlorine, bromine, nitro, cyano, $C_1$–$C_4$-alkoxy, $C_1$–$C_4$-alkoxycarbonyl, methylcarbonylamino, ethylcarbonylamino, phenylcarbonylamino, aminocarbonyl, aminosulphonyl, $C_1$–$C_4$-alkylsulphonyl, phenylsulphonyl or phenylazo;

$R_{10}$ denotes phenyl, benzyl, $C_1$–$C_4$-alkyl, or $C_1$–$C_4$-alkyl substituted by hydroxyl, chlorine, cyano or aminocarbonyl;

$R_{11}$ and $R_{12}$ denote hydrogen or $C_1$–$C_4$-alkyl;

$R_{13}$ and $R_{14}$ denote hydrogen, $C_1$–$C_4$-alkyl or phenyl;

B denotes 1-naphthyl, 2-naphthyl, phenyl, or phenyl monosubstituted, disubstituted or trisubstituted by chlorine bromine, nitro, cyano, $C_1$–$C_4$-alkyl, trifluoromethyl, phenyl, benzyl, $C_1$–$C_4$-alkoxy, phenoxy, benzyloxy, $C_1$–$C_4$-alkoxycarbonyl, phenyloxycarbonyl, benzyloxycarbonyl, carboxyl, $C_1$–$C_4$-alkylsulphonyl, phenylsulphonyl, benzylsulphonyl, $C_1$–$C_4$-alkoxysulphonyl, phenyloxysulphonyl, benzyloxysulphonyl, aminocarbonyl, mono- or di-$C_1$–$C_4$-alkylaminocarbonyl, aminocarbonyl, aminosulphonyl, mono- or di-$C_1$–$C_4$-alkylaminosulphonyl, $C_1$–$C_3$-alkylcarbonyl, $C_1$–$C_3$-alkylcarbonylamino, benzoylamino, phenylamino, mono- or di-$C_1$–$C_4$-alkylamino, benzylamino or phenylazo, and wherein $R_9$ is phenylazo or B is phenyl monosubstituted, disubstituted or trisubstituted with phenylazo; and $An^{(-)}$ is an anion.

4. Methine dyestuff of claim 3 of the formula

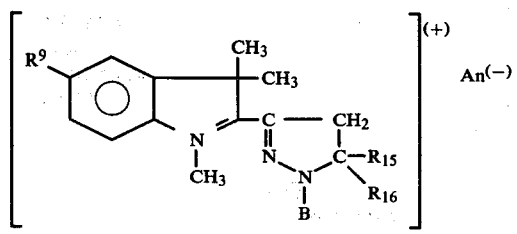

wherein $R_{15}$ and $R_{16}$ are hydrogen or $C_1$–$C_4$-alkyl;

$R_9$ is hydrogen, $C_1$–$C_4$-alkyl, trifluoromethyl, chlorine, bromine, nitro, cyano, $C_1$–$C_4$-alkoxy, $C_1$–$C_4$-alkoxycarbonyl, methyl-, ethyl- or phenyl-carbonylamino, amino-carbonyl or -sulphonyl, $C_1$–$C_4$-alkylsulphonyl, phenylsulphonyl or phenylazo;

B is 1- or 2-naphthyl; or phenyl unsubstituted or monosubstituted, disubstituted or trisubstituted with chlorine, bromine, nitro, cyano, $C_1$–$C_4$-alkyl, trifluoromethyl, phenyl, benzyl, $C_1$–$C_4$-alkoxy, phenoxy, benzyloxy, $C_1$–$C_4$-alkoxycarbonyl, phenyloxycarbonyl, benzyloxycarbonyl, carboxyl, $C_1$–$C_4$-alkylsulphonyl, phenylsulphonyl, benzylsulphonyl, $C_1$–$C_4$-alkoxysulphonyl, phenyloxysulphonyl, benzyloxysulphonyl, aminocarbonyl, mono- or di-$C_1$–$C_4$-alkylaminocarbonyl, aminosulphonyl, mono- or di-$C_1$–$C_4$-alkylaminosulphonyl, $C_1$–$C_3$-alkylcarbonyl, $C_1$–$C_3$-alkylcarbonylamino, benzoylamino, phenylamino, mono- or di-$C_1$–$C_4$-alkylamino, benzylamino or phenylazo; and wherein $R_9$ is phenylazo or B is phenyl monosubstituted, disubstituted or trisubstituted with phenylazo; and $An^{(-)}$ is an anion.

5. Methine dyestuff of the formula